United States Patent Office 2,846,438
Patented Aug. 5, 1958

2,846,438

N-(BETA-DIETHYLAMINOETHYL) ISONICOTINAMIDE

Harry L. Yale and Jack Bernstein, New Brunswick, N. J., assignors to Olin Mathieson Chemical Corporation, a corporation of Virginia No Drawing. Application March 15, 1954
Serial No. 416,408

2 Claims. (Cl. 260—295)

This invention relates to, and has for its object the provision of, certain basic derivatives of isonicotinic acid having valuable pharmacodynamic properties, inter alia, being cardiovascular, parasympatholytic and lissive agents. Certain of these compounds are especially useful for the treatment (including prophylaxis) of cardiac arrhythmias. More specifically, the invention relates to certain bases, N-(Z-lower alkylene)isonicotinamides, and the pharmaceutically-acceptable salts thereof (such as the acid-addition or quaternary-ammonium salts) obtained by the condensation of a diamine (A) of the general formula Y-(lower alkylene)-Z with an isomer-free isonicotinyl derivative of the general formula

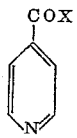

(including quaternary-ammonium salts thereof); Z being a member of the group consisting of

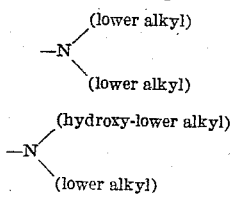

-N-morpholinyl, -N-pyrrolidyl, N-piperidyl; Y being an amino group containing at least one free amino hydrogen; and X being a member of the class consisting of halogen and (lower alkyl)-oxy groups.

The preferred compounds of this invention are the pharmaceutically-acceptable acid-addition salts of the N-(di-loweralkylamino-lower alkylene)isonicotinamides obtained as described hereinbefore, these compounds possessing outstanding utility in the treatment of cardiac arrhythmias. Thus, for example, the monohydrochloride of N-(β-diethylaminoethyl)-isonicotinamide so obtained can be administered (both orally and parenterally) in the same manner as procaine amide hydrochloride in the treatment of ventricular tachycardia, auricular arrhythmia, and runs of ventricular extrasystoles. Due to its long duration of effect, this compound is especially useful when given preoperatively for prevention of the dangerous arrhythmias produced by such anesthetics as cyclopropane. The preferred compounds of this invention, compared with procaine amide hydrochloride, an agent for the treatment of cardiac arrhythmias widely used and accepted by the medical profession, are considerably less toxic, effective for a longer time, and are otherwise superior.

Previously, there have been reports in the literature of certain basic derivatives of isonicotinamide which were prepared as antimalarials, general bactericides, or local anesthetics (it being noted that utility for these purposes has not been established). That fundamental differences exist between such reported compounds and the compounds of this invention is imediately apparent upon comparing, for example, the physical constants of the corresponding compounds and salts, as well as of the reactants employed.

The isomer-free isonicotinyl derivatives (such as isomer-free isonicotinyl chloride, isonicotinyl bromide, isonicotinyl iodide, methyl isonicotinate, ethyl isonicotinate, and propyl isonicotinate) used in the preparation of the compounds of this invention are obtained by conventional methods from isomer-free isonicotinic acid. This acid has become commercially available only recently, and is unique in being derived from isomer-free gamma-substituted pyridines, such as picoline, γ-ethylpyridine. Thus, for example, we have found that isomer-free (sublimed) isonicotinyl chloride is a crystalline solid, M. P. about 155° C., while the priorly-employed isonicotinyl chloride was variously reported as "oily," as "a colorless liquid, M. P. 79° C./14 mm." or as a liquid "M. P. 15–16° C." Isomer-free methyl isonicotinate, we have found, melts at about 17° C., B. P. 72° C./10 mm., $n_D^{23}$ 1.5135; whereas the literature-reported methyl isonicotinate had a melting point of about 8.5° C.

The diamines A utilizable in preparing the compounds of this invention (which are commercially available, or are readily prepared by well-known methods described in the chemical literature) include, inter alia:

N,N-dimethyl-N'-ethyl-ethylenediamine
N,N-diethyl-N'-methyl-ethylenediamine
N,N-diethyl-N'-methyl-trimethylenediamine
N,N-diethyl-tetramethylenediamine
N,N-diethyl-hexamethylenediamine
N,N-diethyl-pentamethylenediamine
N,N-diethyl-ethylenediamine
N-N-dimethyl-trimethylenediamine
N,N-diethyl-propylenediamine
N,N-diisopropyl-ethylenediamine
N-methyl-N-(β-hydroxyethyl)-ethylenediamine
N-ethyl-N-(β-hydroxyethyl)-ethylenediamine
N-ethyl-N-(γ-hydroxypropyl)-trimethylenediamine
N,N-dipropyl-ethylenediamine
N-(γ-amino-propyl)-pyrrolidine
N-(β-amino-ethyl)-morpholine
N-(β-amino-ethyl)-piperidine
N-(β-amino-ethyl)-pyrrolidine In the foregoing method, the bases may be directly obtained as such (that is, as the free base) or in the form of their acid-addition salts (as the hydrochlorides, for example, when X in the isomer-free isonicotinyl derivative is chloro); preferably, where the mono acid-addition salt is to be produced directly, the reaction is carried out employing a ketone as a solvent. The acid-addition salts of this invention may be converted to the free base in the conventional manner, that is, by neutralization with alkali. The free base, which need not be isolated, may be converted into an acid-addition salt by reacting the base (after removal of the excess amine reactant) with the desired acid in a suitable solvent. The preferred solvents, when preparing the mono-addition salts, are the di-lower alkyl ketones, such as acetone, methyl ethyl ketone, or diethyl ketone. Acids utilizable for the production of pharmaceutically-acceptable salts comprise, inter alia, hydrobromic, nitric, lactic, tartaric, citric, succinic, phosphoric, sulfuric, malic, fumaric, and (especially) hydrochloric acid.

Bis(quaternary-ammonium) salts of the aforesaid bases are obtained in the conventional manner (cf. Example 8), by adding to the base an alkyl halide (such as ethyl bromide, methyl iodide and methyl chloride), a polymethylene halide (such as decamethylene chloride and hexamethylene bromide), an aryl halide (such as benzyl chloride, p-nitrobenzyl chloride and benzyl bromide), a dialkyl sulfate (such as dimethyl sulfate and diethyl sulfate), or the like.

The mono quaternary-ammonium compounds of this invention with the quaternization occurring on Z (the basic derivative portion of the molecule) are prepared by reacting a diamine Y-(lower alkylene)-Z, quaternized at Z, with an isomer-free isonicotinyl derivative. The mono quaternary-ammonium compounds with the quaternization occurring on the nitrogen of the pyridine ring are prepared by interacting a diamine A with a quaternized isomer-free isonicotinyl derivative (such as ethyl isonicotinate methiodide, ethyl isonicotinate dimethylsulfate and methyl isonicotinate dimethylsulfate). These compounds have curariform activity.

The following examples are illustrative but by no means limitative of the invention.

EXAMPLE 1

*Preparation of N-(β-diethylaminoethyl)isonicotinamide and its hydrochlorides*

(a) *N-(β-diethylaminoethyl)isonicotinamide.*—A mixture of 60 g. isomer-free methyl isonicotinate (M. P. 17° C., B. P. 72° C./10 mm., $n_D^{23}$ 1.5135) and 261 g. N,N-diethyl-ethylenediamine is refluxed for 24 hours, and then distilled slowly, over an eight-hour period, yielding about 15 cc. methanol. Excess N,N-diethyl-ethylenediamine is distilled off in vacuo (using a steam-bath), and the residue distilled to yield about 61.7 g. of the product, N-(β-diethylaminoethyl)isonicotinamide, boiling at about 165° C./0.5 mm.

*Analysis.*—Calcd. for $C_{12}H_{19}N_3O$: C, 65.12; H, 8.65; N, 18.99; found: C, 64.97; H, 8.45; N, 18.84.

Previously, N-(β-diethylaminoethyl)isonicotinamide has been reported as having been obtained by a reaction employing a "liquid isonicotinyl chloride"; and it was described as a "viscous brown liquid" distilling at 175° C./1 mm.

(b) *N-(β-diethylaminoethyl)isonicotinamide monohydrochloride.*—Preferably, the monohydrochloride is prepared as follows: Anhydrous HCl is bubbled into a solution of 22 g. of N-(β-diethylaminoethyl)isonicotinamide (prepared as described in section *a* of this example) in 200 ml. methyl ethyl ketone, until 0.1 mole HCl has been added. This mixture is then refluxed about one-half hour and filtered; the filtrate, on cooling, deposits the monohydrochloride in an essentially pure state, yielding about 90%.

Alternatively, the hydrochloride may be prepared by adding to a solution of 22 g. N-(β-diethylaminoethyl)-isonicotinamide (prepared as described in section *a* of this example) in 50 ml. of dry acetonitrile, dropwise, with continuous agitation, 22 ml. 4.5 N ethereal HCl. A small amount of granular solid separates; and after storage for about 12 to 16 hours, the solid is removed by filtration. The acetonitrile filtrate is poured into about 300 ml. anhydrous ether; and the precipitated solid is filtered off and recrystallized from methyl ethyl ketone to yield about 6 g. of the product, the monohydrochloride of N-(β-diethylaminoethyl)isonicotinamide.

The N-(β-diethylaminoethyl)isonicotinamide monohydrochloride thus obtained melts at about 106–107° C. and is more than 10% soluble in water; and a 2% aqueous solution thereof has a pH 5.2, which is especially suitable for parenteral administration in the treatment of cardiac arrhythmias.

A hydrochloride (presumably the mono acid-addition salt) of N-(β-diethylaminoethyl)isonicotinamide, prepared from an "oily" isonicotinyl chloride, has previously been described in the literature as a "brown sludge," or as melting at about 245–247° C.

(c) *N-(β-diethylaminoethyl)isonicotinamide dihydrochloride.*—To 61.7 g. N-(β-diethylaminoethyl)isonicotinamide (prepared as described in section *a* of this example) in 200 ml. methanol is added 528 ml. of 1.14 N ethereal HCl; and the resultant crude dihydrochloric precipitate is dissolved in 200 cc. warm methanol, the solution is Darco-treated, and filtered. The filtrate is treated with ethereal HCl until cloudy; and on standing, the product, the dihydrochloride, melting at about 194–196° C., crystallizes.

Following are illustrative compositions for the treatment of cardiac arrhythmias, incorporating as the active ingredient the monohydrochloride of N-(β-diethylaminoethyl)isonicotinamide prepared as described in section *b* of this example.

CAPSULES

| | Per 3200 capsules, gm. |
|---|---|
| Active ingredient (250 mg./capsule) | 800 |
| Cornstarch, USP | 144 |
| Magnesium stearate | 16 |
| | 960 |

(Other inert excipients and/or diluents which can be employed include, inter alia: kaolin, fuller's earth, dicalcium phosphate, talc, magnesium carbonate, magnesium oxide, gums, and the like.)

SOLUTION (ESPECIALLY SUITABLE FOR INTRAVENOUS INJECTION)

| | 100 ml. |
|---|---|
| Active ingredient | gm 10.3 |
| Benzyl alcohol | gm 0.9 |
| Sodium bisulfite | gm 0.09 |
| Sodium citrate (anhydrous) | gm 1.0 |
| HCl, qs. to adjust pH to 5.7, 100 ml. | |

The (liquid) base obtained as described in section *a* of this example can be incorporated into one-piece soft gelatin capsules in the conventional manner, either per se or utilizing a suitable diluent; for example, a composition comprising a fixed oil (such as corn oil) or polyethyleneglycol.

In acute toxicity trials in mice, $LD_{50}$ (mg./kg.) values for the N-(β-diethylaminoethyl)isonicotinamide, prepared as described hereinbefore, and procaine amide, both administered orally as hydrochlorides, were determined to be >1700 and >2500 for the former and 760±4.75 for the latter.

A 2.5% solution of the N-(β-diethylaminoethyl)isonicotinamide hydrochloride, prepared as described hereinbefore (in distilled water), tested intravenously in mice for sensitivity, gave an $LD_{50}$( mg./kg.) value of 253±8.3, while intraperitoneally, an $LD_{50}$ (mg./kg.) value of 587±4 was obtained. The dihydrochloride, prepared as described in section *c*, buffered to pH 5 and similarly tested, gave an $LD_{50}$ (mg./kg.) value of about 240±3.0.

EXAMPLE 2

*Preparation of other salts of N-(β-diethylaminoethyl)-isonicotinamide*

To 22.2 g. N-(β-diethylaminoethyl)isonicotinamide, prepared as described in Example 1, in 100 ml. methyl ethyl ketone is added a solution of 11.5 g. 85% phosphoric acid in 100 ml. methyl ethyl ketone. The mixture is refluxed for about one-half hour and cooled to yield a crystalline product, N-(β-diethylaminoethyl)isonicotinamide monophosphate, M. P. about 194° C.

To a solution of 9 g. 70% nitric acid in 100 ml. water is added 22.2 g. N-(β-diethylaminoethyl)isonicotinamide, prepared as described in Example 1. The solution is lyophilized and the residual solid is crystallized to yield N-(β-diethylaminoethyl)isonicotinamide mononitrate.

EXAMPLE 3

Using a molar equivalent of N,N-dimethyl-ethylenediamine in place of the N,N-diethyl-ethylenediamine in Example 1, the base, and the mono and dihydrochloride of N-(β-dimethylaminoethyl)isonicotinamide are obtained.

EXAMPLE 4

Using a molar equivalent of N,N-diethyl-trimethylenediamine in place of the N,N-diethyl-ethylenediamine in Example 1, the base and the mono and dihydrochloride of N-(γ-diethylaminopropyl)isonicotinamide are obtained.

The base, a colorless liquid, boils at about 171° C./1 mm. Anal.: Calcd. for $C_{13}H_{21}ON_3$: C, 66.34; H, 9.00; N, 17.86; found: C, 66.37; H, 8.80; N, 17.40. [Previously, the N-(γ-diethylaminopropyl)isonicotinamide had been reported as having been obtained by a reaction employing a liquid isonicotinyl chloride, boiling at 79° C./14 mm.; and the resulting base was described as a viscous brown liquid, distilling at 179° C./1 mm. Analysis indicated: C, 66.89; H, 9.30; N, 16.1.]

The N-(γ-diethylaminopropyl)isonicotinamide dihydrochloride, prepared from isomer-free methyl isonicotinate, melts at about 152° C. Anal.: Calcd. N, 13.63; Cl, 23.00; found: N, 13.48; Cl, 22.72. [Previously, a hydrochloride of N-(γ-diethylaminopropyl) isonicotinamide was obtained only in the form of a brown sludge.]

EXAMPLE 5

Using a molar equivalent of N,N-diisopropyl-ethylenediamine in place of the N,N-diethyl-ethylenediamine in Example 1, the base and the mono and dihydrochloride of N-(β-diisopropylaminoethyl)isonicotinamide are obtained.

EXAMPLE 6

*Preparation of N-(β-diethylaminoethyl)isonicotinamide monohydrochloride*

To a refluxing solution of 116 g. N,N-diethyl-ethylenediamine in 2500 ml. methyl ethyl ketone is added portionwise 127.5 g. sublimed isomer-free isonicotinyl chloride (M. P. about 155° C.). The mixture is refluxed for about three hours and cooled to yield N-(β-diethylaminoethyl)isonicotinamide monohydrochloride, M. P. about 106–107° C., yielding about 90%.

Using a molar equivalent of N,N-diisopropyl-ethylenediamine, N,N-dimethyl-trimethylenediamine, or N,N-diethyl-N'-methyl-ethylenediamine in Example 6 in place of the N,N-diethylenediamine yields, respectively, the monohydrochlorides of N-(β-diisopropylaminoethyl)-isonicotinamide, N-(γ-dimethylaminopropyl)isonicotinamide, and N-'β-diethylaminoethyl)-N-methylisonicotinamide.

EXAMPLE 7

*Preparation of 4-[N-(β-diethylaminoethyl)carbamyl]-1-methylpyridinium iodide*

An exothermic reaction occurs when 5.8 g. N,N-diethylethylenediamine is added to a solution of 14.65 g. isomer-free ethyl isonicotinate methiodide (M. P. about 118–120° C., with decomposition) in 50 ml. of methanol. A solid separates, but redissolves on standing for about 15 to 16 hours. The solvent is evaporated by a current of air; and the solid product formed, 4-[N-β-diethylaminoethyl)carbamyl]-1-methylpyridinium iodide, is recrystallized from acetonitrile, M. P. about 148–150° C. (After a second recrystallization from acetonitrile, the product weighs about 9.5 g., and has the same melting point.)

*Analysis.*—Calcd. for $C_{13}H_{22}IN_3O$: N, 11.57; I, 34.94; found: N, 11.74; I, 34.97.

Using a molar equivalent of N,N-dimethyl-ethylenediamine or N,N-diethyl-trimethylenediamine in place of the N,N-diethyl-ethylenediamine in Example 7 yields, respectively 4 - [N - (β - dimethylaminoethyl)carbamyl]-1-methylpyridinium iodide and 4-[N-(γ-diethylaminopropyl)carbamyl]-1-methylpyridinium iodide.

Using a molar equivalent of isomer-free ethyl isonicotinate ethobromide or ethyl isonicotinate methochloride in place of the ethyl isonicotinate methiodide in Example 7 yields, respectively, 4-[N-β-diethylaminoethyl)carbamyl]-1-ethylpyridinium bromide and 4-[N-(β-diethylaminoethyl)carbamyl]-1-methylpyridinium chloride.

EXAMPLE 8

*Preparation of 4-[(β-diethylaminoethyl)carbamyl]-1-methylpyridinium iodide, methiodide*

To 11.1 g. N-(β-diethylaminoethyl)isonicotinamide, prepared as described in Example 1, is added 14.2 g. methyl iodide in 25 ml. of dry acetone. An exothermic reaction occurs, and a thick oil separates. After about 12 to 16 hours, the acetone is decanted, and the oil is dissolved in 25 ml. of warm absolute ethanol. On cooling, a crystalline solid separates, and is filtered off, yielding about 19 g. of product, M. P. about 146–147° C. This product, 4-[(β-diethylaminoethyl)carbamyl]-1-methylpyridinium iodide, methiodide, recrystallized from a mixture of 50 ml. 95% ethanol and 50 ml. absolute ethanol, weighs about 16 g., M. P. about 155–157° C.

*Analysis.*—Calc. for $C_{14}H_{25}I_2N_3O$: N, 8.32; I, 50.25; found: N, 8.03; I, 50.35.

Using a molar equivalent of dimethylsulfate in place of the methyl iodide in Example 8 yields 4-[(β-diethylaminoethyl)carbamyl]-1-methylpyridinium methosulfate, methyl methosulfate.

Using a molar equivalent of N-(β-dimethylaminoethyl)-isonicotinamide or N-(γ-diethylaminopropyl)isonicotinamide, prepared as described in Examples 3 and 4, in place of the N-(β-diethylaminoethyl)isonicotinamide in Example 8 yields, respectively, 4-[(β-dimethylaminoethyl)carbamyl]-1-methylpyridinium iodide, methiodide and 4 - [(γ - diethylaminopropyl)carbamyl] - 1 - methylpyridinium iodide, methiodide.

EXAMPLE 9

To 22.2 g. N-(β-diethylaminoethyl)isonicotinamide, prepared as described in Example 1, in 50 ml. dry acetonitrile is added 21.8 g. ethyl bromide. The mixture is kept at room temperature for 12 to 16 hours, and then diluted with ether. The product, recrystallized from an alcohol-ether solution, 4-[(β-diethylaminoethyl)carbamyl]-1-ethylpyridinium bromide, ethobromide.

EXAMPLE 10

*Preparation of N-[β-(1-pyrrolidyl)ethyl]isonicotinamide and its monohydrochloride*

(a) *N - [β - (1-pyrrolidyl)ethyl]isonicotinamide.*—A mixture of 137 g. isomer-free methyl isonicotinate (M. P. 17° C., B. P. 72° C./10 mm., $n_D^{23}$ 1.5135) and 228 g. N-(β-aminoethyl)pyrrolidine is refluxed for 8 hrs., then distilled slowly to remove methanol. The residual liquid is distilled to yield first the excess N-(β-aminoethyl)pyrrolidine and then N-[β-(1-pyrrolidyl)ethyl]isonicotinamide, B. P. about 180° C./0.5 mm., yielding about 80%.

(b) *N - [β - (1-pyrrolidyl)ethyl]isonicotinamide monohydrochloride.*—Into a solution of 22.2 g. of the base, obtained as described in section a of this example, in 200 ml. methyl ethyl ketone is bubbled a total of 3.6 g. of dry hydrogen chloride. The mixture is refluxed for 1 hr., filtered hot, and cooled, yielding the crystalline monohydrochloride of N-[β-(1-pyrrolidyl)ethyl]-isonicotinamide.

Using a molar equivalent of N-(γ-aminopropyl)-pyrrolidine or N-(β-aminoethyl)piperidine in place of the N-(β-aminoethyl)pyrrolidine in Example 10 yields, respectively, the monohydrochloride of N-[γ-(1-pyrrolidyl)propyl]isonicotinamide and of N-(β-(1-piperidyl)-ethyl]isonicotinamide.

We claim:

1. The pure, isomer free monohydrochloride of N-(β-diethylaminoethyl)isonicotinamide, melting at about 106–107° C.

2. The pure, isomer free dihydrochloride of N-(β-diethylaminoethyl)isonicotinamide, melting at about 194–196° C.

(References on following page)

References Cited in the file of this patent

UNITED STATES PATENTS

| | | |
|---|---|---|
| 1,886,481 | Hartmann | Nov. 8, 1932 |
| 2,654,758 | Papa | Oct. 6, 1953 |
| 2,666,053 | Fox | Jan. 12, 1954 |

FOREIGN PATENTS

| | | |
|---|---|---|
| 462,972 | Great Britain | Mar. 15, 1937 |

OTHER REFERENCES

Rosenberg: Chemistry and Physiology of the Vitamins, 1942, Interscience Publishers, Inc., New York, N. Y., page 239.

Linnell et al.: Quarterly Journal of Pharmacy and Pharmacology, vol. 20, pages 119–23 (1947).